US007826803B2

(12) United States Patent
Takasu

(10) Patent No.: US 7,826,803 B2
(45) Date of Patent: Nov. 2, 2010

(54) INFORMATION PROCESSING APPARATUS AND CONNECTION CONTROL METHOD

(75) Inventor: Nobuaki Takasu, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 14 days.

(21) Appl. No.: 12/333,187

(22) Filed: Dec. 11, 2008

(65) Prior Publication Data

US 2009/0156131 A1    Jun. 18, 2009

(30) Foreign Application Priority Data

Dec. 18, 2007    (JP) .............................. 2007-326234

(51) Int. Cl.
*H04B 1/00*    (2006.01)
*H04B 7/00*    (2006.01)
(52) U.S. Cl. .......................... 455/69; 455/423; 455/425; 455/67.11; 455/67.13; 455/68; 455/556.1; 455/574; 455/440; 455/441; 340/539.11; 340/539.22; 340/539.3; 340/568.1; 340/572.3
(58) Field of Classification Search ... 455/414.1–414.2, 455/421, 423, 425, 436, 437, 440, 441, 456.1, 455/456.3, 456.6, 556.1, 556.2, 557, 67.11, 455/67.13, 68, 69, 574; 340/539.1, 539.11, 340/539.13, 539.22, 539.23, 539.26, 539.3, 340/568.1, 572.3
See application file for complete search history.

(56) References Cited

U.S. PATENT DOCUMENTS 6,405,038 B1 * 6/2002 Barber et al. ............... 455/434

6,433,683 B1 * 8/2002 Robinson ................... 340/540
7,536,186 B2 * 5/2009 Dorenbosch et al. ........ 455/440
7,633,836 B2 * 12/2009 Choi et al. .................... 368/11
2004/0198306 A1 * 10/2004 Singh et al. ................. 455/345
2006/0052109 A1 * 3/2006 Ashman et al. ............. 455/440

FOREIGN PATENT DOCUMENTS

| JP | 2001-042978 | 2/2001 |
| JP | 2004-343350 | 12/2004 |
| JP | 2005-513973 | 5/2005 |
| JP | 2007-124577 | 5/2007 |
| JP | 2007-156471 | 6/2007 |
| JP | 2007-158471 | 6/2007 |

OTHER PUBLICATIONS

Yasushi Uesaka et al., "Resume Function on Distributed Computing Technology" Technical Report of Information Processing Society of Japan, vol. 1993, No. 12, (Jan. 29, 1993), pp. 65-72.
Office Action for Japanese Patent Application No. 2007-326234, mailed Feb. 17, 2009.
An English translation of Notice of Reasons for Rejection issued by the Japan Patent Office on Feb. 17, 2009.

* cited by examiner

*Primary Examiner*—Tuan A Tran
(74) *Attorney, Agent, or Firm*—Knobbe, Martens, Olson & Bear LLP

(57) ABSTRACT

According to one embodiment, an information processing apparatus includes a wireless communication module to wirelessly connect with an external device, a sensor to detect movement of the information processing apparatus, and a disconnection control module to instruct the wireless communication module to terminate wireless connection with the external device when start of movement is detected based on information output from the sensor during wireless connection with the external device by the wireless communication module.

4 Claims, 4 Drawing Sheets

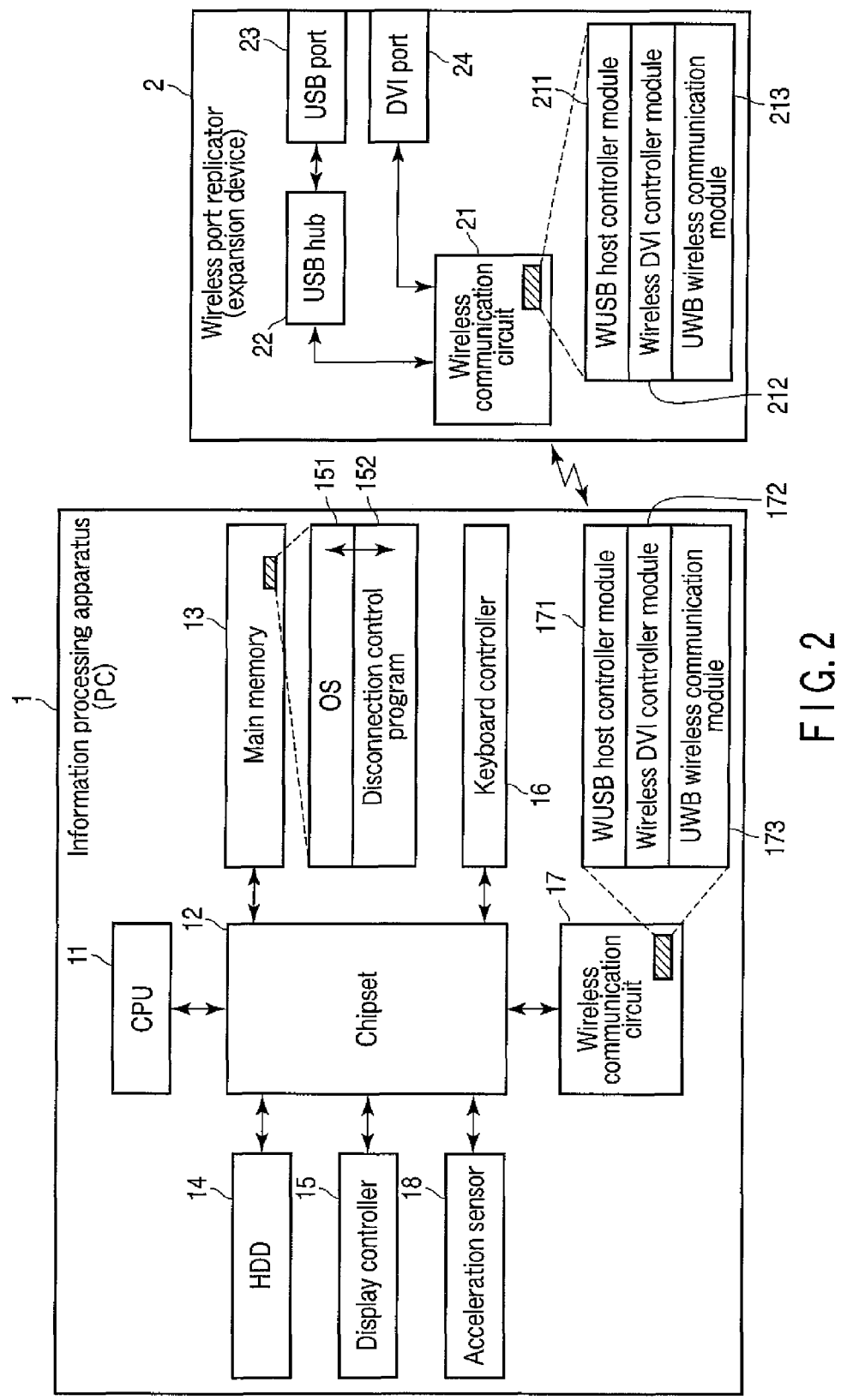
F I G. 2

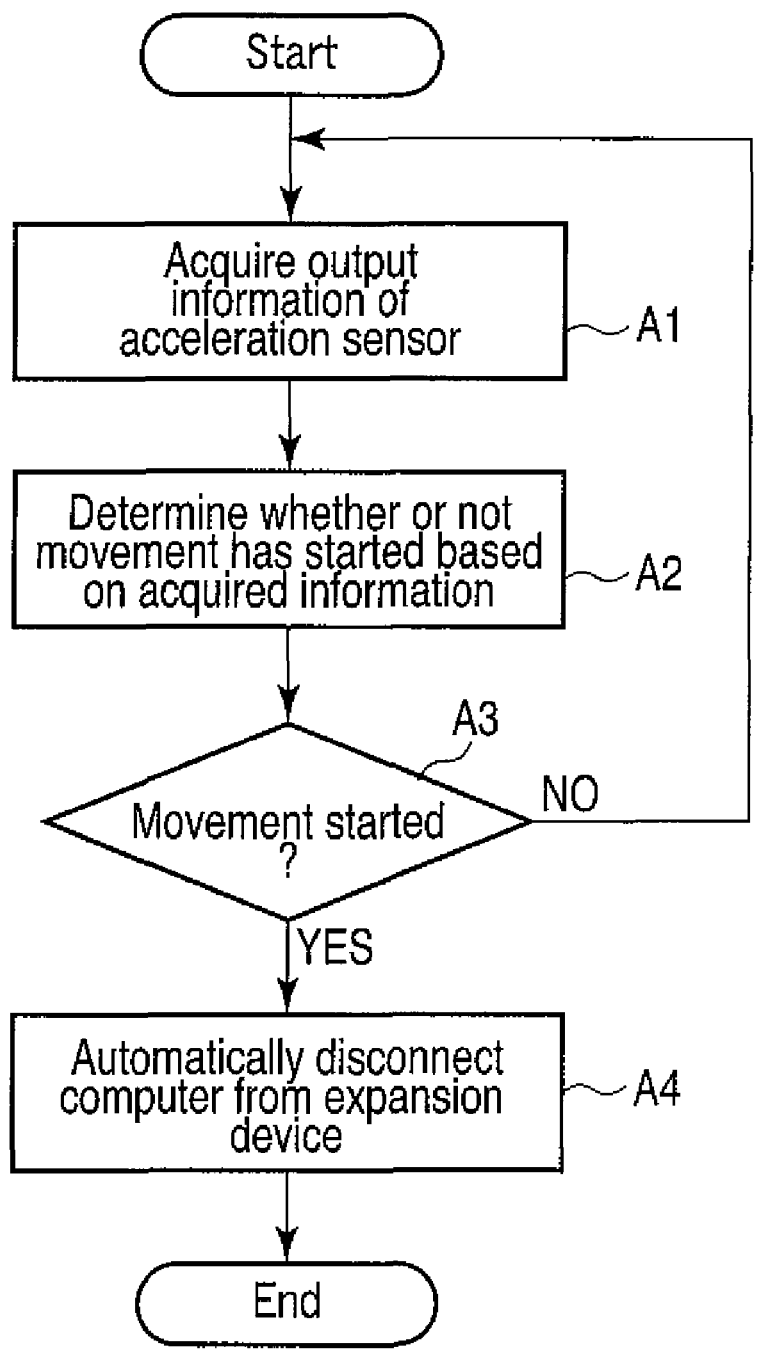
F I G. 3

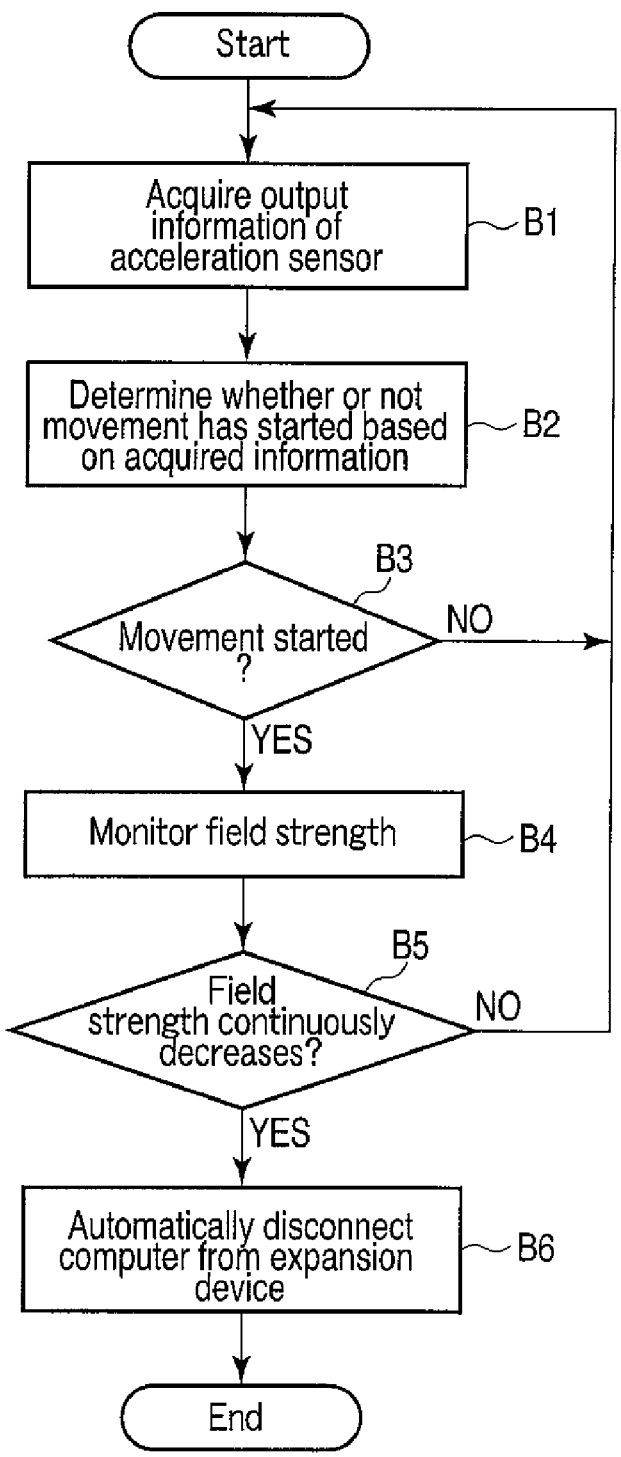
F I G. 4

INFORMATION PROCESSING APPARATUS AND CONNECTION CONTROL METHOD

CROSS-REFERENCE TO RELATED APPLICATIONS

This application is based upon and claims the benefit of priority from Japanese Patent Application No. 2007-326234, filed Dec. 18, 2007, the entire contents of which are incorporated herein by reference.

BACKGROUND OF THE INVENTION

1. Field of the Invention

One embodiment of the invention relates to a wireless communication control technique suitable for an information processing apparatus such as a personal computer.

2. Description of the Related Art

In recent years, various types of personal computers such as notebook computers and desktop computers have prevailed. It has become a more common practice for such computers to have a wireless communication function capable of wirelessly exchanging data with an external device.

Data exchange via wireless communication channels is more dependent on different environments (typically, a change in the position of a wireless device due to movement) than that via wired communication channels. Furthermore, it is difficult for a user to appreciate the situation. Various measures against the environmental change have been proposed (see, e.g., Jpn. Pat. Appln. KOKAI Publication No. 2007-158471).

These days, using a notebook computer as a stand alone device outside the office and also using it wirelessly connected to an external device called a wireless port replicator for function expansion in the office is being established. Consider a case in which the user goes out of the office when a personal computer is used like this. It is useful to have a mechanism which automatically terminates the wireless connection with the wireless port replicator when the user raises the personal computer from the desk (to put it in a bag or the like), since then the user need not execute a disconnection operation.

Conventional techniques such as that proposed in Jpn. Pat. Appln. KOKAI Publication No. 2007-158471 are, however, aimed at avoiding data loss and maintaining wireless connection. An idea that a specific event is used as a trigger for actively terminating wireless connection (even in a situation in which the wireless connection can be sufficiently maintained) does not exist.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing a system configuration of the personal computer of the embodiment;

FIG. 3 is an exemplary flowchart showing the operation procedure of an automatic connection termination control process, which is executed on the personal computer of the embodiment, of wireless connection with a wireless port replicator; and FIG. 4 is an exemplary flowchart showing the operation procedure of an automatic connection termination control process (a modification example), which is executed on the personal computer of the embodiment, of wireless connection with a wireless port replicator.

DETAILED DESCRIPTION OF THE PREFERRED EMBODIMENT

Figure 1:
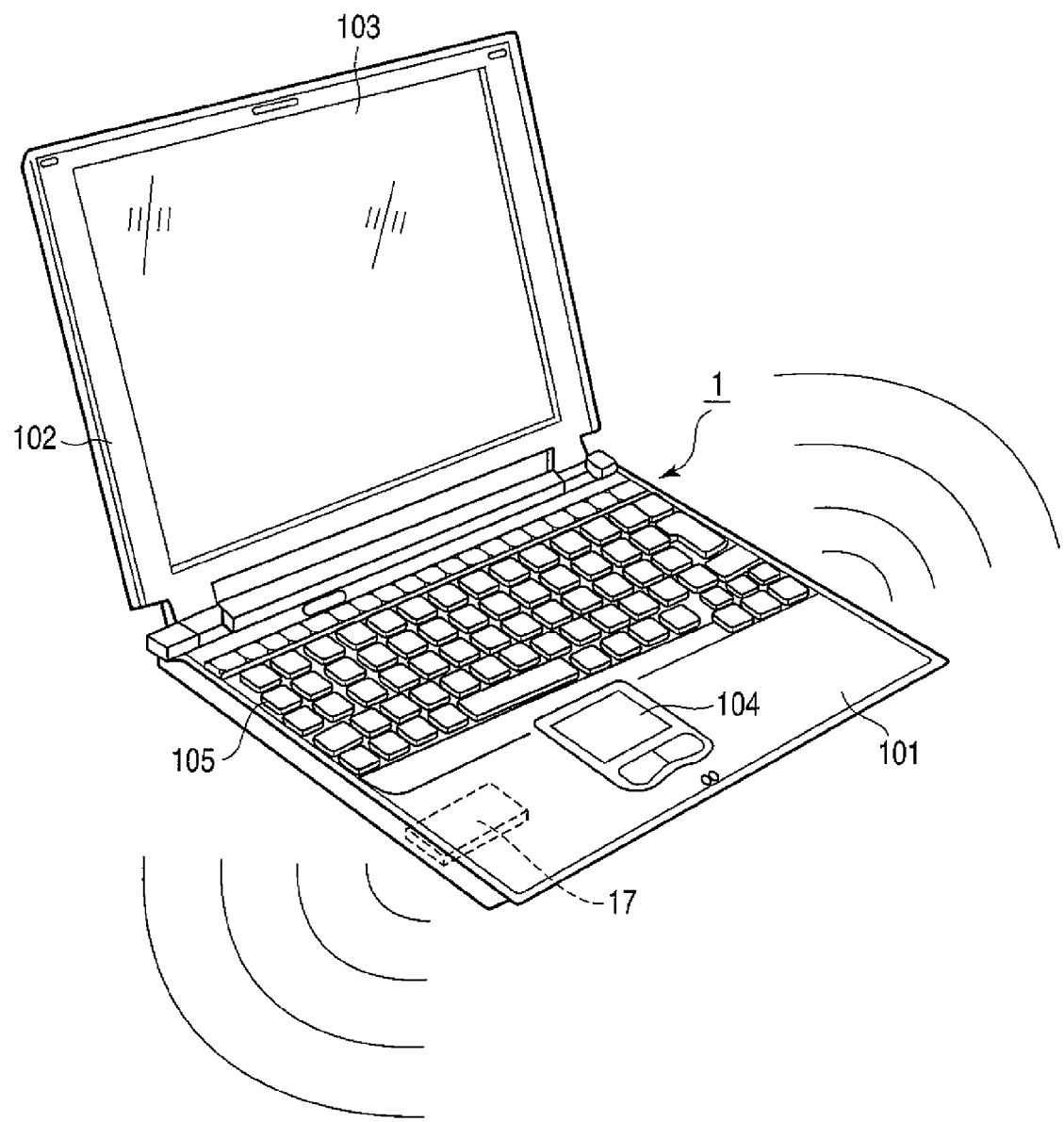
FIG. 1 is an exemplary view showing the outer appearance of an information processing apparatus (personal computer) according to an embodiment of the invention.

Various embodiments according to the invention will be described hereinafter with reference to the accompanying drawings. In general, according to one embodiment of the invention, an information processing apparatus includes a wireless communication module to wirelessly connect with an external device, a sensor to detect movement of the information processing apparatus, and a disconnection control module to instruct the wireless communication module to terminate wireless connection with the external device when start of movement is detected based on information output from the sensor during wireless connection with the external device by the wireless communication module.

FIG. 1 is an exemplary view showing the outer appearance of an information processing apparatus according to the embodiment. In this example, assume that an information processing apparatus 1 is implemented as a notebook personal computer (PC) easily carried by a user.

As shown in FIG. 1, the computer 1 comprises a computer body 101 and a display unit 102. The display unit 102 is attached to the computer body 101 to be pivotal between the open position and closed position. The display unit 102 incorporates a liquid crystal display (LCD) 103 configuring a display panel. The LCD 13 is located almost at the center of the display unit 102.

The computer body 101 has a thin-box like housing, on which a pointing device 104 and a keyboard 15 are arranged. Furthermore, the computer body 101 incorporates a wireless communication circuit 17 which provides a wireless communication function.

FIG. 2 shows the system configuration of the computer 1. As shown in FIG. 2, the computer 1 incorporating the wireless communication circuit 17 which provides a wireless communication function can wirelessly connect a wireless port replicator 2 serving as an expansion device for function expansion. As shown in FIG. 2, the computer 1 includes a CPU 11, a chipset 12, a main memory 13, a hard disk drive (HDD) 14, a display controller 15, a keyboard controller 16, and the wireless communication circuit 17.

The CPU 11 is a processor which controls the computer 1 as a whole. The CPU 11 executes various programs such as an operating system (OS) 151 and a disconnection control program 152 (described later) operating under the control of the OS 151, stored in the main memory 13. The chipset 12 is a circuit which relays communication between the CPU 11 and other units. The chipset 12 therefore incorporates various controllers for executing drive control of the units.

The main memory 13 is a main storage of the computer 1. The main memory 13 stores various programs executed by the CPU 11, and various data used in these programs. The HDD 14 is an external storage of the computer 1. The HDD 14 serves as an auxiliary memory of the main memory 13 to store a large amount of various programs and data.

The display controller 15 controls the output side of a user interface provided by the computer 1, and displays screen data created by the CPU 11 on the LCD 103. On the other hand, the keyboard controller 16 controls the input side of the user interface provided by the computer 1, and communicates the operations of the keyboard and mouse to the CPU 11.

The wireless communication circuit 17 executes high-speed wireless communication using an ultra-wideband (UWB) scheme. For this purpose, the wireless communication circuit 17 includes a wireless Universal Serial Bus (USB) host controller module 171, wireless Digital Video Interface (DVI) controller module 172, and UWB wireless communication module 173. The UWB wireless communication module 173 forms a UWB wireless communication physical layer. Both the wireless USB host controller module 171 and wireless DVI controller module 172 execute wireless communication using the UWB wireless communication physical layer formed by the UWB wireless communication module 173. The wireless USB host controller module 171 provides a wireless USB function, while the wireless DVI controller module 172 provides a wireless DVI function.

An acceleration sensor 18 detects movement of the computer 1 when, for instance, the user raises the computer 1 from the desk (to put it in a bag). The disconnection control program 152 executed by the CPU 11 monitors information output from the acceleration sensor 18, and detects the movement of the computer 1 and its direction on the basis of the information. The computer 1 controls automatically terminating, by the disconnection control program 152, the wireless connection with the wireless port replicator 2 upon detection of movement in a predetermined direction. This will be described in detail below.

The configuration of the wireless port replicator 2 will now be briefly explained. As shown in FIG. 2, the wireless port replicator 2 includes a wireless communication circuit 21, USB hub 22, USB port 23, and DVI port 24. For example, a USB device is connected to the USB port 23 of the wireless port replicator 2, and an external display device with a DVI terminal is connected to the DVI port 24 with a cable. In this case, the computer 1 can cablelessly transfer files to the USB device and supply moving image display data to the external display device.

Consider a case in which the user of the computer 1 is going to carry the computer 1 which is wirelessly connected with the wireless port replicator 2 on the desk.

In this case, the user picks up the computer 1. The disconnection control program 152 executed by the CPU 11 detects the movement of the computer 1 due to this action by monitoring information output from the acceleration sensor 18. Upon detecting that the computer 1 moves upward (in a direction opposite to the direction of gravity) by an amount larger than a predetermined one, the disconnection control program 152 determines that the computer 1 will be carried from there, i.e., movement has started. The program 152 then instructs, via the OS 151, the wireless communication circuit 17 to terminate the wireless connection with the wireless port replicator 2. When, for example, the computer 1 is slid horizontally on the desk (for instance, the user accidentally moves the computer 1 or finely adjusts its position), the wireless connection with the wireless port replicator 2 is therefore maintained (since the program 152 does not determine that movement has started).

This eliminates the need for the user to check whether the computer 1 is wirelessly connected with the wireless port replicator 2 when the user carries the computer 1. Furthermore, even if the computer 1 is wirelessly connected with the wireless port replicator 2, the user need not terminate the wireless connection with the wireless port replicator 2.

FIG. 3 is an exemplary flowchart showing the operation procedure of an automatic connection termination control process, which is executed on the computer 1, of the wireless connection with the wireless port replicator 2.

The disconnection control program 152 monitors information output from the acceleration sensor 18 (block A1), and, based on the information, determines whether movement of the computer 1 has started (block A2).

If the disconnection control program 152 determines that movement of the computer 1 has started (YES in block A3), it instructs, via the OS 151, the wireless communication circuit 17 to terminate the wireless connection with the wireless port replicator 2 (block A4).

A case in which the disconnection control program 152 controls automatic termination of the wireless connection with the wireless port replicator 2 only on the basis of the information output from the acceleration sensor 18 has been explained above. A modification example in which the program 152 controls automatic termination of the wireless connection with the wireless port replicator 2 by using information available from the wireless communication circuit 17 in addition to the information output from the acceleration sensor 18 will be described next.

The wireless communication circuit 17 which actually controls the wireless communication with the wireless port replicator 2 recognizes the field strength and error rate of the wireless communication with the wireless port replicator 2. When the acceleration sensor 18 outputs information based on which the disconnection control program 152 can determine that movement of the computer 1 has started, the program 152 acquires, e.g., the field strength from the wireless communication circuit 17. If the field strength tends to continuously decrease, the program 152 determines that movement of the computer 1 has started, and instructs, via the OS 151, the wireless communication circuit 17 to terminate the wireless connection with the wireless port replicator 2.

If the field strength continuously decreases or the error rate continuously increases, it is assumed that the computer 1 is being moved away from the wireless port replicator 2. It is therefore possible to prevent the wireless connection with the wireless port replicator 2 from being terminated by mistake by combining this feature with an event from which it can be estimated that the computer 1 has been picked up.

FIG. 4 is an exemplary flowchart showing the operation procedure of an automatic connection termination control process (a modification example), which is executed on the computer 1, of the wireless connection with the wireless port replicator 2.

The disconnection control program 152 monitors information output from the acceleration sensor 18 (block B1), and, based on the information, determines whether movement of the computer 1 has started (block B2).

If the disconnection control program 152 determines that movement of the computer 1 has started (YES in block B3), it acquires, e.g., the field strength from the wireless communication circuit 17 (block B4).

If the field strength continuously decreases (YES in block B5), the disconnection control program 152 instructs, via the OS 151, the wireless communication circuit 17 to terminate the wireless connection with the wireless port replicator 2 (block B6).

As described above, the computer 1 can automatically terminate the wireless connection with the external device upon movement of itself.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
 a wireless communication module configured to wirelessly connect to an external device;
 a sensor configured to detect a movement of the information processing apparatus; and
 a disconnection controller configured to instruct the wireless communication module to terminate wireless connection to the external device when the movement is detected based on information from the sensor during wireless connection to the external device by the wireless communication module, wherein
 the disconnection controller is configured to receive a radio field strength of the wireless connection to the external device from the wireless communication module, and to instruct the wireless communication module to terminate the wireless connection to the external device when the radio field strength continuously decreases after the movement is detected.

2. An information processing apparatus comprising:
 a wireless communication module configured to wirelessly connect to an external device;
 a sensor configured to detect a movement of the information processing apparatus; and
 a disconnection controller configured to instruct the wireless communication module to terminate wireless connection to the external device when the movement is detected based on information from the sensor during wireless connection to the external device by the wireless communication module, wherein the disconnection controller further configured to receive an error rate of the wireless connection to the external device from the wireless communication module, and to instruct the wireless communication module to terminate the wireless connection to the external device when the error rate continuously increases after the movement is detected.

3. A disconnection control method of an information processing apparatus which comprises a wireless communication module configured to wirelessly connect to an external device, the method comprising:
 detecting a movement of the information processing apparatus; and
 instructing the wireless communication module to terminate wireless connection to the external device when the movement of the information processing apparatus is detected during wireless connection to the external device by the wireless communication module,
 wherein the instructing the wireless communication module further comprises instructing the wireless communication module to terminate the wireless connection to the external device when the radio field strength continuously decreases after the movement is detected.

4. A disconnection control method of an information processing apparatus which comprises a wireless communication module configured to wirelessly connect to an external device, the method comprising:
 detecting a movement of the information processing apparatus; and
 instructing the wireless communication module to terminate wireless connection to the external device when the movement of the information processing apparatus is detected during wireless connection to the external device by the wireless communication module, further comprising receiving an error rate of the wireless connection to the external device from the wireless communication module,
 wherein the instructing the wireless communication module further comprises instructing the wireless communication module to terminate the wireless connection to the external device when the error rate continuously increases after the movement is detected.

* * * * *